US011119492B2

(12) United States Patent
Wang et al.

(10) Patent No.: US 11,119,492 B2
(45) Date of Patent: Sep. 14, 2021

(54) AUTOMATICALLY RESPONDING TO EMERGENCY SERVICE VEHICLES BY AN AUTONOMOUS VEHICLE

(71) Applicant: SF Motors, Inc., Santa Clara, CA (US)

(72) Inventors: Fan Wang, Santa Clara, CA (US); Yifan Tang, Santa Clara, CA (US); Tom Zhang, Santa Clara, CA (US); Ke Huang, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 94 days.

(21) Appl. No.: 16/274,201

(22) Filed: Feb. 12, 2019

(65) Prior Publication Data

US 2020/0257299 A1 Aug. 13, 2020

(51) Int. Cl.
| | |
|---|---|
| *G05D 1/02* | (2020.01) |
| *G08G 1/0965* | (2006.01) |
| *G05D 1/00* | (2006.01) |
| *B60Q 9/00* | (2006.01) |

(52) U.S. Cl.
CPC ............. *G05D 1/0214* (2013.01); *B60Q 9/00* (2013.01); *G05D 1/0088* (2013.01); *G05D 1/0231* (2013.01); *G05D 1/0255* (2013.01); *G08G 1/0965* (2013.01); *G05D 2201/0213* (2013.01)

(58) Field of Classification Search
CPC .. G05D 1/0214; G05D 1/0255; G05D 1/0088; G05D 1/0231; G05D 2201/0213; G08G 1/0965; B60Q 9/00; B60W 30/00
See application file for complete search history.

(56) References Cited

U.S. PATENT DOCUMENTS

| | | | |
|---|---|---|---|
| 8,838,321 B1* | 9/2014 | Ferguson | G05D 1/0214 |
| | | | 701/23 |
| 9,278,689 B1* | 3/2016 | Delp | G08G 1/0965 |
| 9,766,628 B1* | 9/2017 | Lo | G06K 9/4661 |
| 9,921,581 B2* | 3/2018 | Tseng | G05D 1/0287 |
| 2004/0068352 A1 | 4/2004 | Anderson | |
| 2004/0193349 A1 | 9/2004 | Flann et al. | |

(Continued)

OTHER PUBLICATIONS

Xing, Shiyu and Jakiela, Mark, "Lane Change Strategy for Autonomous Vehicle" (2018). Mechanical Engineering and Materials Science Independent Study. 61.

*Primary Examiner* — Michael J Zanelli
(74) *Attorney, Agent, or Firm* — Bachmann Law Group PC

(57) ABSTRACT

An autonomous vehicle that automatically responds to an emergency service vehicle. Perception data is captured or received by the autonomous vehicle (AV) cameras, sensors, and microphones. The perception data is used to detect lanes in a road, generate a list of objects, classify one or more of the objects, and determine a state for the classified objects. In response to detecting an emergency service vehicle such as a law enforcement vehicle, a responsive action may be planned by the AV. The responsive action may include sending an acknowledgement signal, notifying passengers of the AV, generating a planned trajectory based on the emergency service vehicle location, an emergency service vehicle detected intention, and other information. A safety check may be performed, and commands may be generated by a control module to navigate the AV along the planned trajectory. The commands may then be executed by a DBW module.

23 Claims, 12 Drawing Sheets

(56) References Cited

U.S. PATENT DOCUMENTS

| | | |
|---|---|---|
| 2009/0162825 A1 | 6/2009 | Sakai et al. |
| 2009/0168653 A1 | 7/2009 | Pierre et al. |
| 2011/0238457 A1 | 9/2011 | Mason et al. |
| 2013/0315257 A1 | 11/2013 | Welin et al. |
| 2014/0188382 A1 | 7/2014 | Pan et al. |
| 2014/0277835 A1 | 9/2014 | Filev et al. |
| 2015/0353087 A1 | 12/2015 | Niino et al. |
| 2016/0226757 A1 | 8/2016 | Dharmadhikari et al. |
| 2016/0245662 A1 | 8/2016 | Rajagopalan et al. |
| 2016/0272204 A1 | 9/2016 | Takahashi et al. |
| 2016/0297447 A1 | 10/2016 | Suzuki |
| 2017/0008522 A1 | 1/2017 | Sato et al. |
| 2017/0129501 A1 | 5/2017 | Lee |
| 2017/0249839 A1* | 8/2017 | Becker ................... H04W 4/90 |
| 2017/0327115 A1 | 11/2017 | Tokimasa et al. |
| 2017/0349173 A1 | 12/2017 | Nishiguchi et al. |
| 2017/0369067 A1 | 12/2017 | Saigusa et al. |
| 2018/0057002 A1 | 3/2018 | Lee et al. |
| 2018/0150081 A1 | 5/2018 | Gross et al. |
| 2018/0225975 A1 | 8/2018 | Park |
| 2018/0240345 A1 | 8/2018 | So |
| 2018/0293894 A1 | 10/2018 | Zhang |
| 2018/0345991 A1 | 12/2018 | Mimura et al. |
| 2018/0374347 A1* | 12/2018 | Silver ................... G06F 16/683 |
| 2019/0061766 A1 | 2/2019 | Nishiguchi |
| 2019/0071076 A1 | 3/2019 | Nakatsuka et al. |
| 2020/0241552 A1* | 7/2020 | Leenayongwut ....... G10L 25/18 |

\* cited by examiner

AUTOMATICALLY RESPONDING TO EMERGENCY SERVICE VEHICLES BY AN AUTONOMOUS VEHICLE

BACKGROUND

Autonomous driving technology is growing rapidly with many features implemented in autonomous vehicles. Some car manufacturers have implemented navigation systems that assist an autonomous vehicle to navigate a road. When a situation involving an emergency service vehicle arises, typical car manufacturers' navigation systems are not designed to provide adequate responses to such vehicles, resulting in an unsafe driving environment for the emergency service vehicle and other vehicles on the road.

SUMMARY

The present technology, roughly described, provides an autonomous vehicle that automatically responds to an emergency service vehicle. Perception data is captured or received by the autonomous vehicle (AV) sensors, such as cameras, radars, lidars, and microphones. The perception data is used to detect lanes in a road being navigated by the AV, generates a list of objects, classify one or more of the objects, and determine a state for the classified objects. An object may be classified as a vehicle, and may be further classified as an emergency service vehicle, such as for example a law enforcement vehicle, ambulance, or fire truck. In response to detecting an emergency service vehicle such as a law enforcement vehicle, a responsive action may be planned by the AV. The responsive action may include generating a planned trajectory based on the location of the emergency service vehicle, a detected intention of the emergency service vehicle or the vehicle's driver, communication with emergency service vehicle, and other information. A safety check may be performed, and commands may be generated by a control module to navigate the AV along the planned trajectory. The commands may then be executed by a (drive-by-wire) DBW module. The generation of trajectory and/or other actions may involve navigation that would not otherwise apply during normal navigation along a road, such as for example directing the AV onto the shoulder of a road.

By automatically responding to the emergency service vehicle, the AV is better equipped to obey traffic rules and provide a safer environment for the emergency service vehicle as well as other vehicles on the road. An AV of the present technology may perform responsive actions such as sending acknowledgement signal to a law enforcement vehicle, notifying passengers on AV, changing lanes to get out of an emergency service vehicle's perceived paths, pullover to shoulder portion of a road when being pulled over by a law enforcement vehicle, and/or proceed with increased caution.

In embodiments, a system for automatically responding to an emergency service vehicle is disclosed. The system includes a data processing system comprising one or more processors, memory, a perception module, a planning module, and a control module. One or more modules within the data processing system can be executed by the one or more processors to identify an object on a road based on received sensor data, classify the identified object as a type of emergency service vehicle based on the sensor data, determine the intention of the type of emergency service vehicle at least in part based on the location of the emergency service vehicle. In some instances, the one or more modules can also send an acknowledgement and notify the passengers in the AV. The planning module can further generate a decision to respond to the emergency service vehicle and proceeds on a selected trajectory based on the classification and the intention, and generates one or more commands to navigate along the selected trajectory.

In embodiments, a non-transitory computer-readable storage medium includes a program, the program being executable by a processor to perform a method for automatically navigating a vehicle between lanes using a bias offset. The method can identify an object on a road based on received sensor data, classify the identified objects as a type of emergency service vehicle based on the sensor data, and determine the intention of the type of emergency service vehicle at least in part based on the location of the type of emergency service vehicle. In some instances, the one or more modules can also send an acknowledgement and notify the passengers in the AV. The method also includes generating a decision to respond to the emergency service vehicle and proceed on a selected trajectory based on the classification and the intention, and generating one or more commands to navigate along the selected trajectory.

In embodiments, a method is disclosed for automatically navigating a vehicle between lanes using a bias offset. The method includes identifying an object on a road based on received sensor data, classifying the identified object as a type of emergency service vehicle based on the sensor data, and determining the intention of the type of emergency service vehicle at least in part based on the location of the type of emergency service vehicle. In some instances, the one or more modules can also send an acknowledgement and notify the passengers in the AV. The method also includes generating a decision to respond to the emergency service vehicle and proceed on a selected trajectory based on the classification and the intention, and generating one or more commands to navigate along the selected trajectory.

DETAILED DESCRIPTION

Figure 1A:
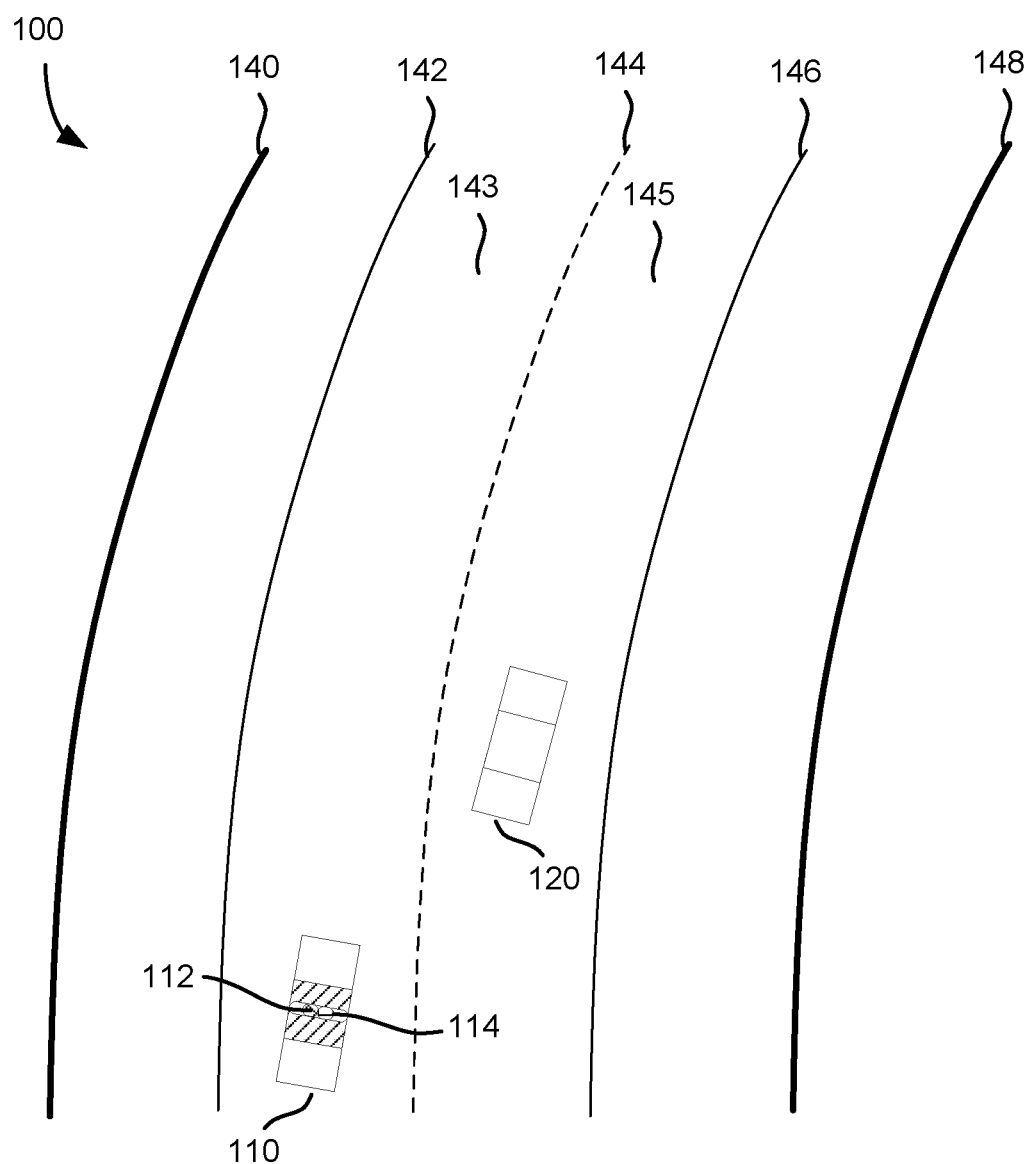
FIG. 1A illustrates a law enforcement vehicle behind an autonomous vehicle.

The present technology, roughly described, provides an autonomous vehicle that automatically responds to an emergency service vehicle. Perception data is captured or received by the autonomous vehicle (AV) sensors including cameras, radars, lidars, and microphones. The perception data is used to detect lanes in a road being navigated by the AV, generate a list of objects, classify one or more of the objects, and determine a state for the classified objects. An object may be classified as a vehicle, and may be further classified as an emergency service vehicle, such as for example a law enforcement vehicle, ambulance, or fire truck. In response to detecting an emergency service vehicle such as a law enforcement vehicle, a responsive action may be planned by the AV. The responsive action may include one or more of sending an acknowledgement signal, notifying passengers in the AV, generating a planned trajectory based on the location of the emergency service vehicle, in some instances the navigation history of the emergency service vehicle, a detected intention of the emergency service vehicle, and other information. A safety check may be performed, and commands may be generated by a control module to navigate the AV along the planned trajectory. The commands may then be executed by a DBW module. The trajectory and/or other actions may involve navigation that would not otherwise apply during normal navigation along a road, such as for example directing the AV onto the shoulder of a road.

By automatically responding to the emergency service vehicle, the AV is better equipped to obey traffic rules and provide a safer environment for the emergency service vehicle as well as other vehicles on the road. An AV of the present technology may perform responsive actions such as changing lanes to get out of an emergency service vehicle's perceived trajectory, pullover to shoulder portion of a road when being pulled over by a law enforcement vehicle, and/or proceed with additional caution.

The presented technology responds to emergency service vehicles in a sophisticated manner by detecting the emergency service vehicle's intention (i.e., the driver's intention) and executing an action that responds to that intention. The emergency service vehicle's (i.e., the driver's intention) intention may be determined based on the location of the vehicle, the navigation history of the vehicle, and the current state of the vehicle. The location, navigation history, and current state are continuously updated and analyzed to determine the intention of the emergency service vehicle and if any action is required by the AV.

The technical problem addressed by the presented technology involves safely and successfully automatically navigating an AV in the presence of an emergency service vehicle. When an emergency service vehicle is present, cars in the presence of the vehicle are expected to follow traffic rules which require them to yield to the emergency service vehicle or comply with requests to pull over onto a shoulder or other safe location. Processing perception data to classify an object as a vehicle, and then to further classify a vehicle as a particular type of emergency service vehicle, is not an easy task. Further, once a particular type of emergency service vehicle has been detected, logic for generating a responsive action to the emergency service vehicle is important, as it may include navigation not typically performed or which may not be legal for a vehicle in normal driving situations.

The present technology provides a technical solution to the technical problem of safely and effectively navigating an AV in the presence of an emergency service vehicle. The presented technology automatically retrieves data, such as sensor data from cameras, radars, lidars, and microphone, and processes the data to accurately detect and distinguish emergency service vehicles such as a law enforcement vehicle from other vehicles on a road. Once detected, the AV system may determine an intention of the vehicle, and thereby determine if any action is needed in response to an emergency service vehicle's activity or the vehicle/driver's intention.

The disclosure herein discloses a method for an AV to automatically respond to an emergency service vehicle. The emergency service vehicle may be referred to as a law enforcement vehicle in portions of the disclosure, but other emergency service vehicles may also be detected, classified, and responded to as well, including but not limited to an ambulance, fire engine or fire truck, and any other service vehicle that provides a visual, audible or wireless notification that should result in another vehicle taking a particular action, such as yielding or pulling over to the road shoulder.

FIG. 1A illustrates a law enforcement vehicle behind an autonomous vehicle. Environment 100 of FIG. 1A includes law enforcement vehicle 110 and AV 120. Vehicles 110-120 are traveling in lanes 143 and 145, respectively. Cameras, radars, lidars, and microphones on AV 120 can detect that law enforcement vehicle 110 has flashing lights 112 as well as a siren 114 blaring.

Figure 1B:
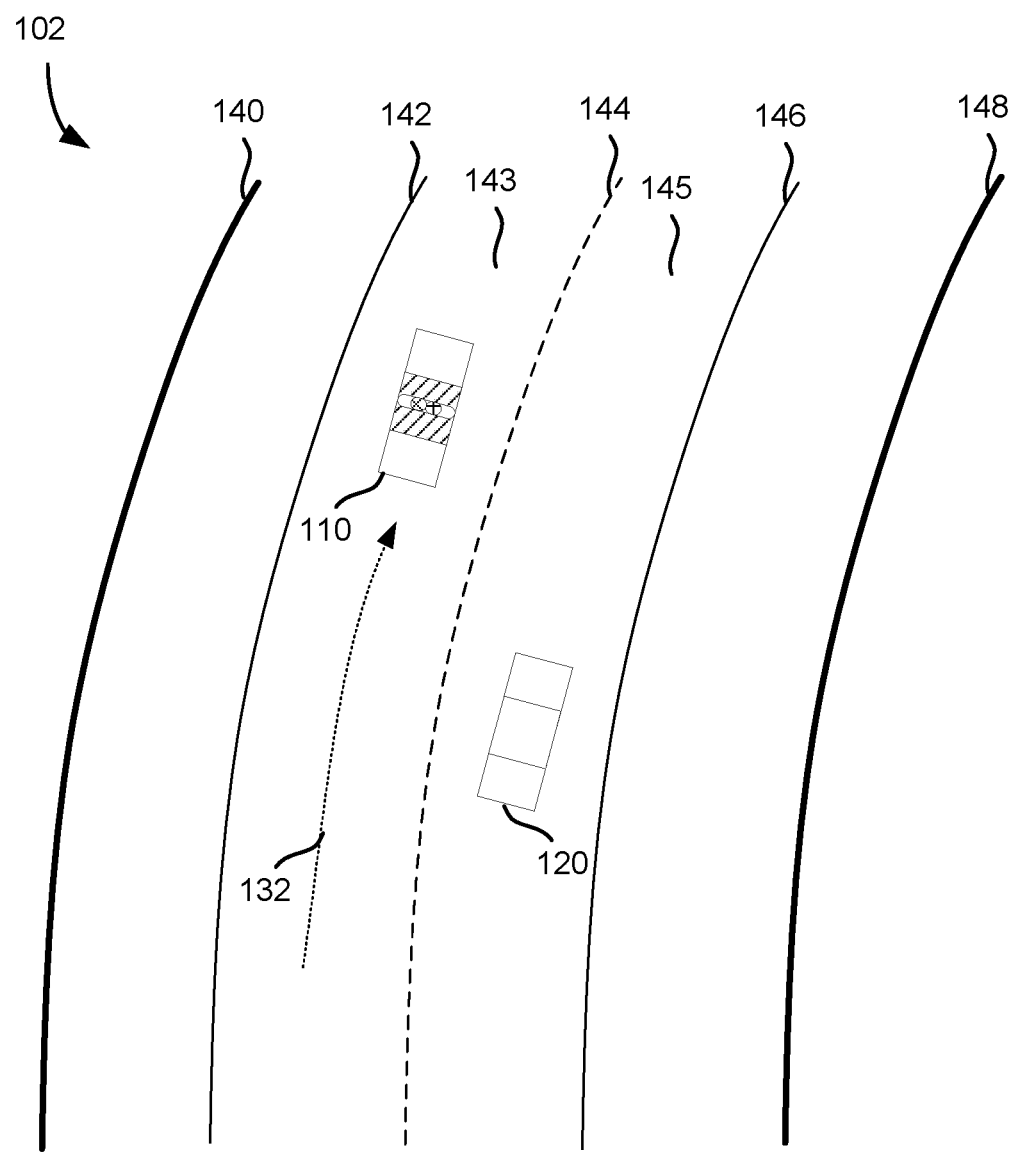
FIG. 1B illustrates a law enforcement vehicle with an intention to pass an autonomous vehicle.

FIG. 1B illustrates a law enforcement vehicle having an intention to pass an autonomous vehicle. Law enforcement vehicle 110 travels along path 132 from the original location of the vehicle illustrated in FIG. 1A to its current location in FIG. 1B. As the law enforcement vehicle 110 proceeds along path 132 with a siren blaring, lights flashing, or both, the path, siren, and flashing lights are detected by AV 120 and processed to determine the intention of the law enforcement vehicle. In the scenario illustrated in FIG. 1B, the data processing system of AV 120 can determine that the law enforcement vehicle's (or driver's intention) intention is to proceed quickly along lane 143. As such, AV 120 may make a decision to stay in a current lane or switch to an adjacent lane if it is safer. Based on the final decision, the AV 120 may generate a trajectory and execute commands to navigate along the planned trajectory.

Figure 1C:
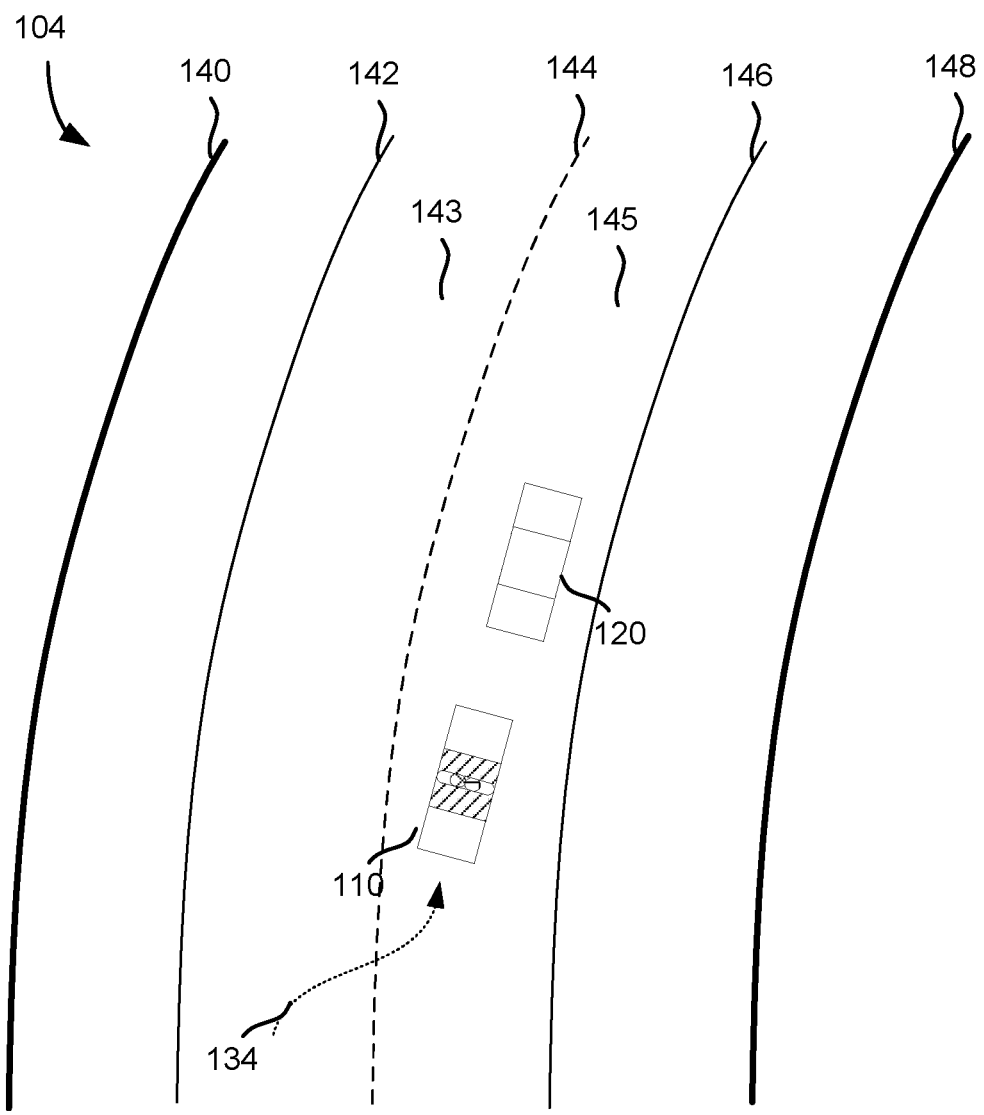
FIG. 1C illustrates a law enforcement vehicle with an intention to pull over an autonomous vehicle.

FIG. 1C illustrates a law enforcement vehicle with an intention to pull over an autonomous vehicle. Law enforcement vehicle 110 has traveled along a path 134 from its original location in FIG. 1A to a second location directly behind AV 120 in the scenario illustrated in FIG. 1C. Based on the new law enforcement vehicle location, the flashing lights and a blaring siren, the AV 120 can detect that the law enforcement vehicle 110 has the intention to pull the AV over. In response, AV 120 can decide to pull over, and generate a trajectory to pullover from lane 145 to the shoulder between Lane line 146 and road boundary 148. AV 120 can also send an acknowledgement signal back to the law enforcement vehicle using a visual indicator (e.g., lights) or other signal, such as for example one or more V2X signals. AV 120 can also, in some instances, notify passengers in the AV of its intention to pull over using audible (speaker), visual (lights, video, graphics on a screen), or some other indicator.

Figure 1D:
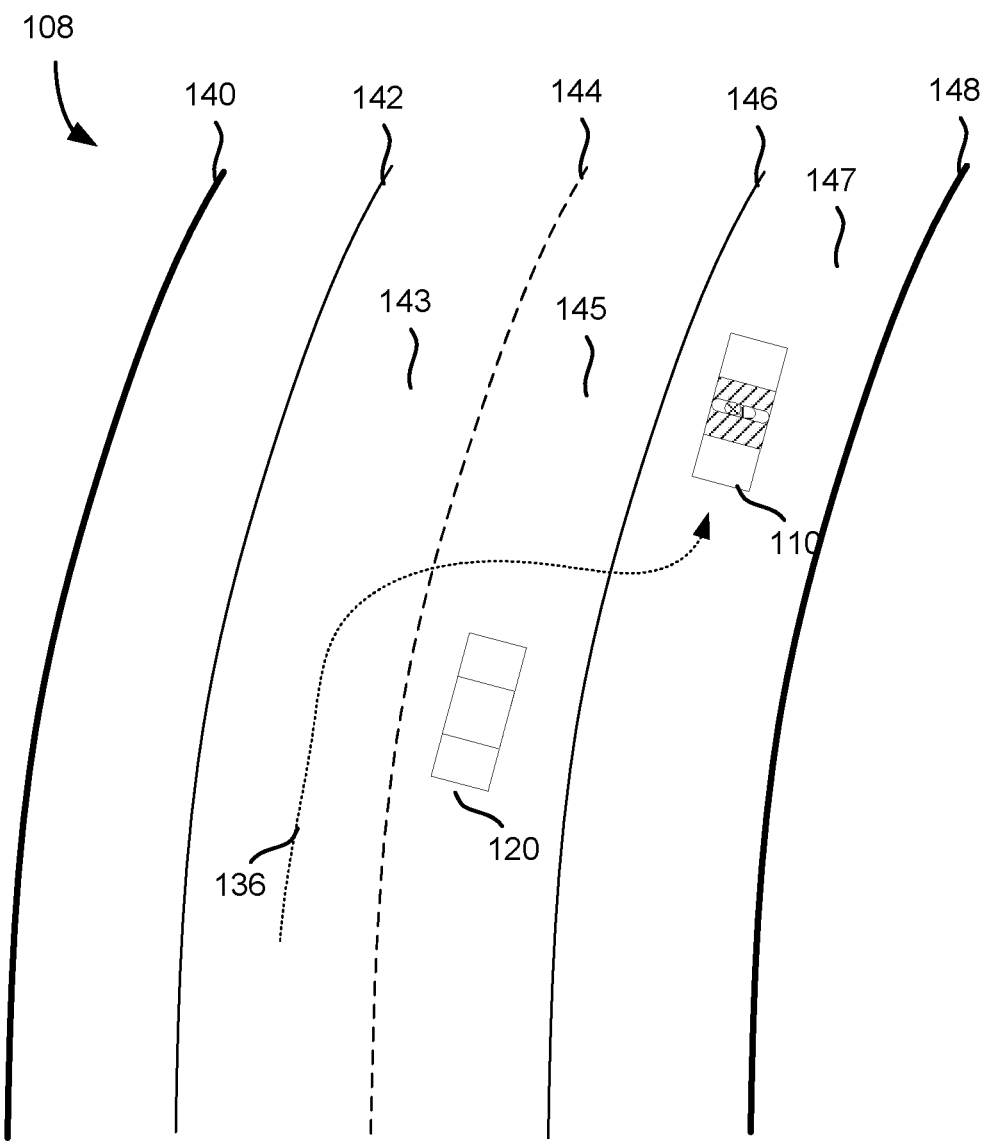
FIG. 1D illustrates a law enforcement vehicle with an intention to navigate onto a shoulder.

FIG. 1D illustrates a law enforcement vehicle with an intention to navigate onto a road shoulder. The path of law enforcement vehicle 110 has resulted in the vehicle 110 positioned on road shoulder 147 between lane line 146 and road boundary 148. The position on the road shoulder may indicate that the law enforcement vehicle 110 has pulled over another vehicle or is attending to some other issue at the shoulder. In any case, AV 120 may detect the intention to pull over to the shoulder, generate a decision for action in response to the intention, such as for example to slow down or change lanes to an adjacent lane. AV 120 may then generate a trajectory that complies with the decision, and then generate commands to execute the generated trajectory.

The scenarios discussed with respect to FIGS. 1A-1D are intended to be examples only, and are not intended to limit the range of detected intention, generated decisions, or actions performed by the AV in response to an emergency service vehicle. Encounters with emergency service vehicles such as a law enforcement vehicle may be interpreted as one or more intentions, which can change over time and computing cycles based on changing emergency service vehicle and AV location and updated intention analysis, as is discussed in more detail herein.

Figure 2:
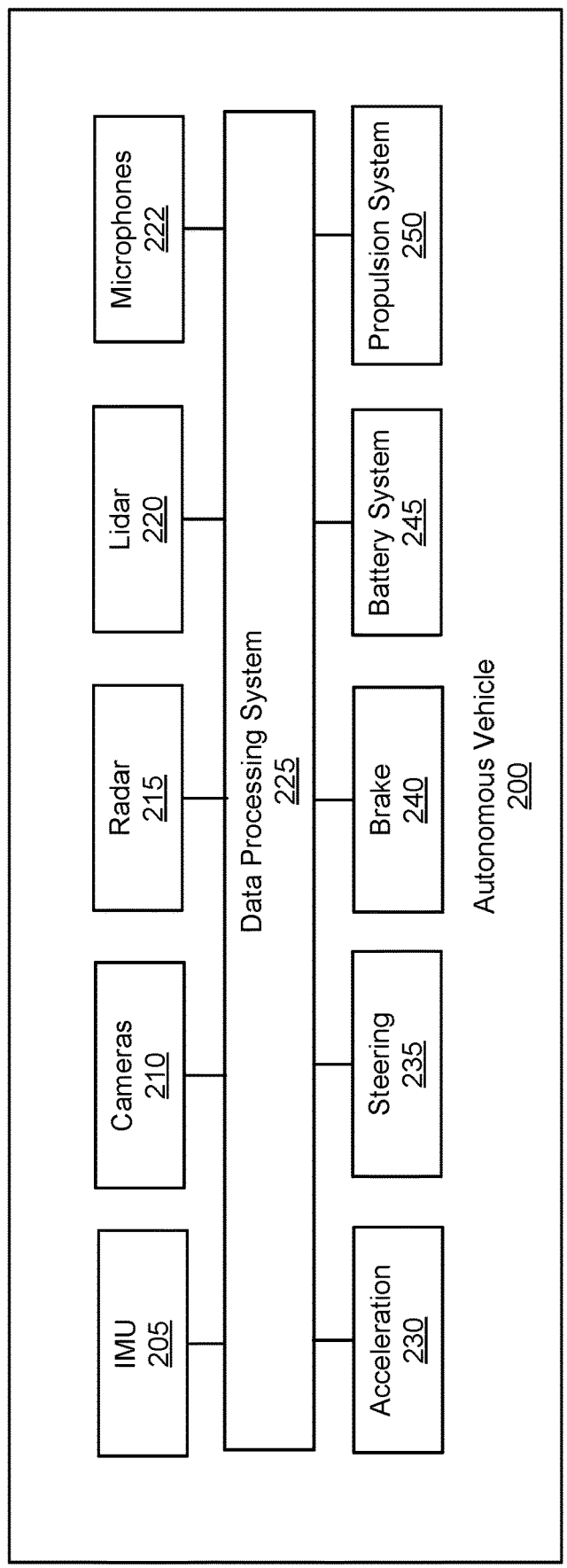
FIG. 2 is a block diagram of an autonomous vehicle.

FIG. 2 is a block diagram of an autonomous vehicle. The autonomous vehicle 210 of FIG. 2 includes a data processing system 225 in communication with an inertia measurement unit (IMU) 205, cameras 210, radar 215, lidar 220, and microphones 222. Data processing system 225 may also communicate with acceleration 230, steering 235, breaks 240, battery system 245, and propulsion system 250. The data processing system and the components it communicates with are intended to be exemplary for purposes of discussion. It is not intended to be limiting, and additional elements of an autonomous vehicle may be implemented in a system of the present technology, as will be understood by those of ordinary skill in the art.

IMU 205 may track and measure the autonomous vehicle acceleration, yaw rate, and other measurements and provide that data to data processing system 225 as well as other components in AV 200.

Cameras 210, radar 215, lidar 220, and microphones 222 may form all or part of a perception component of autonomous vehicle 210. The autonomous vehicle may include one or more cameras 210 to capture visual data inside and outside of the autonomous vehicle. On the outside of the autonomous vehicle, multiple cameras may be implemented. For example, cameras on the outside of the vehicle may capture a forward-facing view, a rear-facing view, and optionally other views. Images from the cameras may be processed to detect objects such as streetlights, stop signs, lines or borders of one or more lanes of a road, and other aspects of the environment for which an image may be used to better ascertain the nature of an object than radar. To detect the objects, pixels of images can be processed to recognize objects, and singular images and series of images. The processing may be performed by image and video detection algorithms, machine learning models, computer vision techniques, deep learning techniques, and other algorithms which operate to detect particular objects of interest, as well as other object detection techniques.

Radar 215 may include multiple radar sensing systems and devices to detect objects around the autonomous vehicle. In some instances, a radar system may be implemented at one or more of each of the four corners of the vehicle, on the front side of the vehicle, on the rear side of the vehicle, and on the left side and right side of the vehicle. Lidar may be used to detect objects in adjacent lanes, as well as in front of and behind the current vehicle. The radar and lidar sensors may be used to detect stationary and moving objects in adjacent lanes as well as in the current lane in front of and behind the autonomous vehicle.

Data processing system 225 may include one or more processors, memory, and instructions stored in memory and executable by the one or more processors to perform the functionality described herein. In some instances, the data processing system may include a perception module, a planning module, a control module, and a drive-by-wire module. The modules communicate with each other to receive raw and processed data (e.g., classified object information and law enforcement state data) from a perception component, generate decisions and plan trajectories and other actions, and generate commands to execute the trajectories. The data processing system 225 is discussed in more detail below with respect to the system of FIG. 2.

Acceleration 230 may receive commands from the data processing system to accelerate. Acceleration 230 may be implemented as one or more mechanisms to apply acceleration to the propulsion system 250. Steering module 235 controls the steering of the vehicle, and may receive commands to steer the vehicle from data processing system 235. Brake system 240 may handle braking applied to the wheels of autonomous vehicle 210, and may receive commands from data processing system 225. Battery system 245 may include a battery, charging control, battery management system, and other modules and components related to a battery system on an autonomous vehicle. Propulsion system 250 may manage and control propulsion of the vehicle, and may include components of a combustion engine, electric motor, drivetrain, and other components of a propulsion system utilizing an electric motor with or without a combustion engine.

Figure 3:
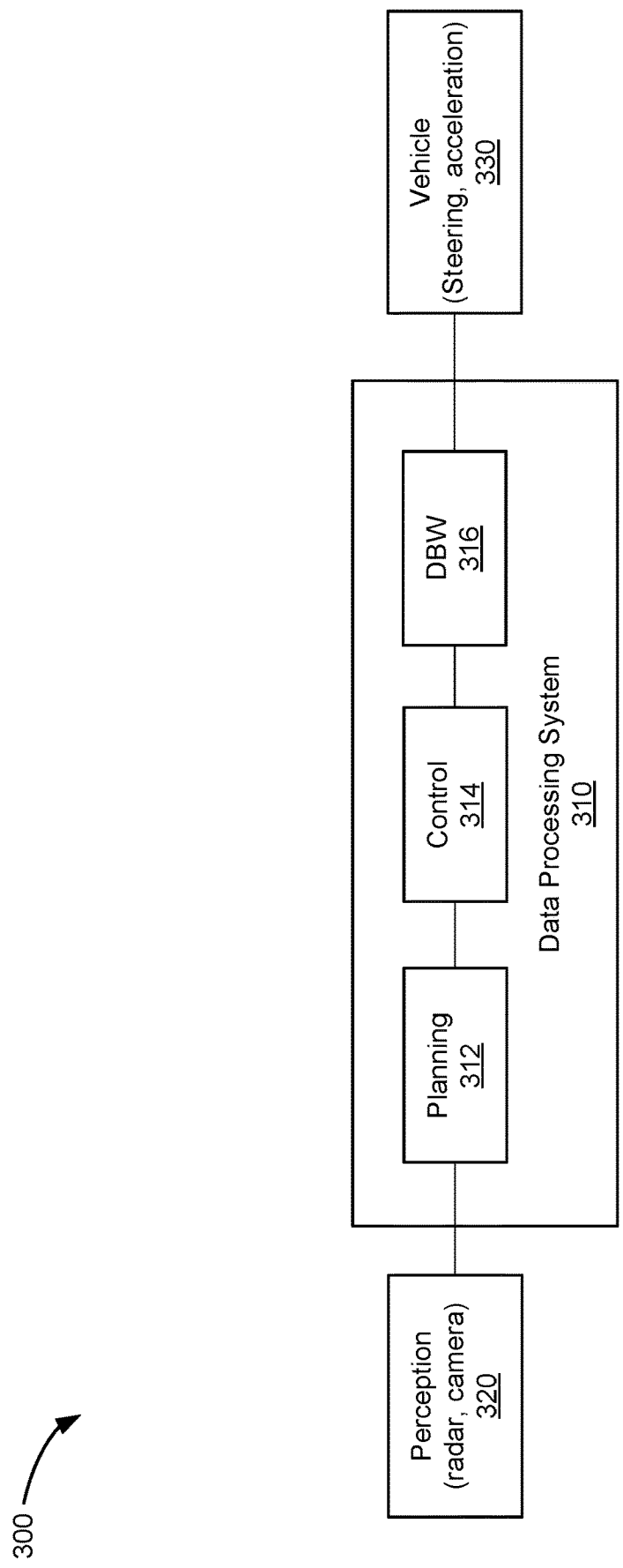
FIG. 3 is a block diagram of a data processing system within an autonomous vehicle.

FIG. 3 is a block diagram of a data processing system within an autonomous vehicle. Data processing system 310 provides more detail for the data processing system 225 of the system of FIG. 2. The data processing system may receive data and information from perception component 320. Perception component 320 may include radar, lidar, microphone, and camera elements, as well as logic for processing the element output to identify objects of interest, lane lines, and other elements. The logic may also classify an object into one or more classifications and sub-classifications (e.g., vehicle and type of emergency service vehicle), and determine the state of an object. Perception 320 may provide a list of objects, object classifications, object state, and lane detection data to planning module 312.

Planning module 312 may receive and process data and information received from the perception component to plan actions for the autonomous vehicle. The action planning may include determining an object intention, generating a decision for an action in response to the object classification, generating a trajectory to execute the decision, and navigating the AV according to the trajectory, or example from a current lane to the adjacent lane, stopping, pulling onto a shoulder or other portion of a road outside of designated lane, accelerating, turning, and performing other actions. Planning module 312 may generate samples of trajectories between two lines or points, analyze and select the best trajectory, and provide the best trajectory for navigating from one point to another for control module 314.

Control module 314 may receive information from the planning module 312, such as a selected trajectory over which a lane change should be navigated. Control module 314 may generate commands to be executed in order to navigate the selected trajectory. The commands may include instructions for accelerating, braking, and turning an AV to effectuate navigation along the selected trajectory.

Drive-by-wire (DBW) module 316 may receive the commands from control module 314 and actuate the autonomous vehicle navigation components based on the commands. In particular, DBW module 316 may control the accelerator, steering wheel, brakes, turn signals, and optionally other components 330 of the autonomous vehicle to perform the navigation.

Figure 4:
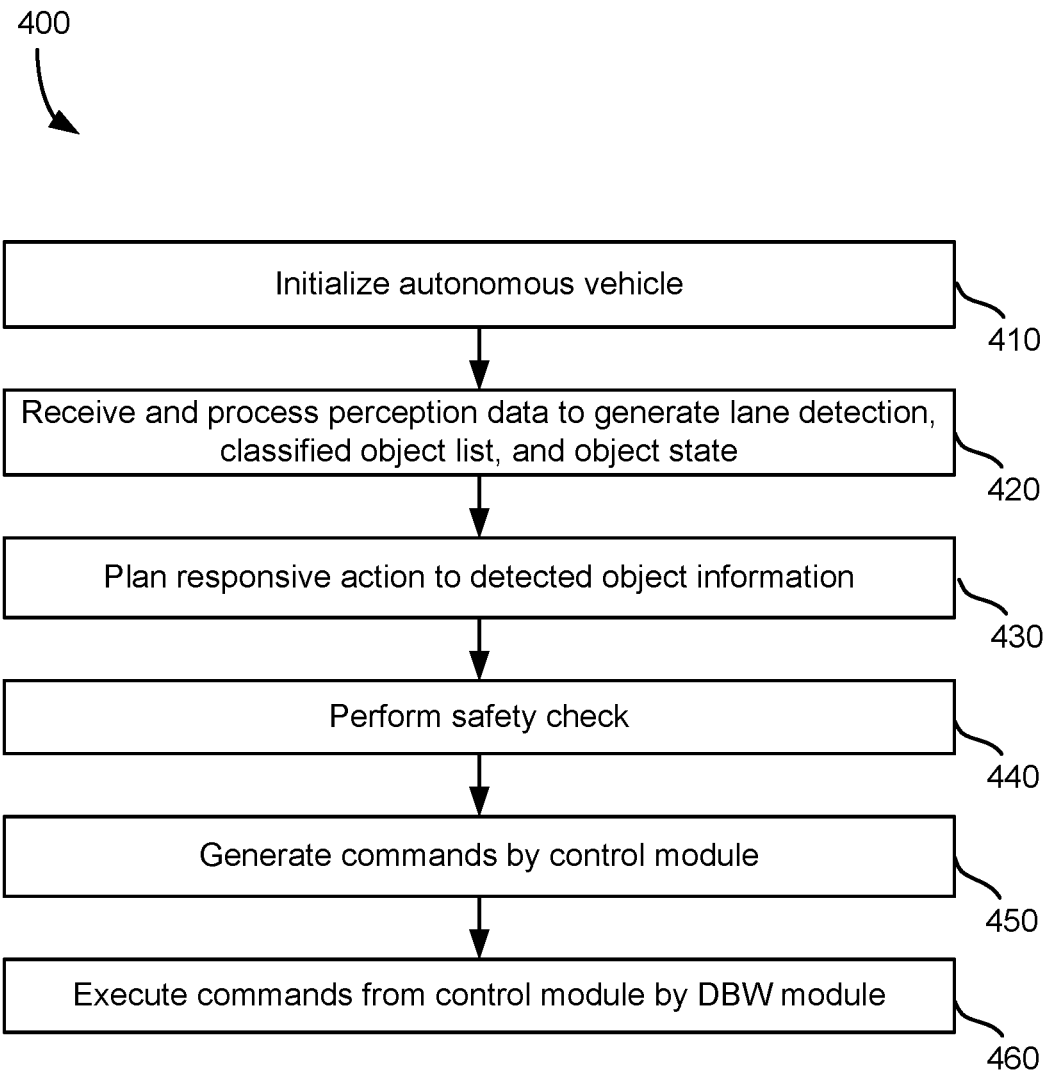
FIG. 4 is a method for responding to an emergency service vehicle by an autonomous vehicle.

FIG. 4 is a method for responding to an emergency service vehicle by an AV. The AV is initialized at step 410. Initializing the AV may include starting the AV, performing an initial system check, calibrating the vehicle to the current ambient temperature and weather, loading passenger and/or other preferences and settings, and calibrating any systems as needed at startup.

Perception data is received and processed at step 420. The perception data may be processed to detect lanes in a road currently traveled by the AV, one or more classified object lists, and associated object states. The perception data may include image data from one or more cameras, data received from one or more sensors such as radar and lidar sensors, audio data from microphones, and other data, as well as processed information such as object state and classification of an object. In some instances, an object detected by the perception module can be classified as a vehicle. A vehicle can be further classified as an emergency service vehicle, such as for example a law enforcement vehicle. When a law enforcement vehicle is detected, the AV may take actions based at least upon the state and location of the law enforcement vehicle.

The perception data may be received by one or more perception components and may be processed by logic associated with the perception component 320. Once the classified object list, lane detection data, and object state are generated, they are provided to the data processing system. More details for receiving and processing perception data are discussed with respect to the method of FIG. 5.

In response to receiving the classified object list, lane detection data, and object status, the data processing system may plan a responsive action to a classified object at step 430. Planning a responsive action may include determining the vehicle object location, determining the vehicle object intention, generating a decision about what action to take, sending a feedback signal to the emergency service vehicle, communicating information to the AV passengers, and generating a trajectory based on the decision. More details for plan a responsive action is discussed in more detail below with respect to the method of FIG. 7.

Once the planning module generates a selected trajectory, a safety check is performed at step 440. A safety check may include confirming that no obstacles exist or will exist along the selected trajectory, no collisions will occur along the selected trajectory, and that the autonomous vehicle can physically navigate along the selected trajectory in an appropriate manner, for example without any jerk or with an acceptable level of jerk Commands are generated by the control module in response to receiving the selected trajectory at step 450. The commands implement the acceleration, braking, and steering needed to navigate the autonomous vehicle on the selected trajectory. The commands are received by the DBW module 316 from the control module 314 and are executed by the DBW module 316 at step 460. As a result of executing the commands, the AV navigates along a path associated with a selected trajectory.

In some instances, steps 420-460 are performed repeatedly, with the intention of the emergency service vehicle being updated continually. In response to the updated intention, the decisions made by the AV data processing system can also be updated continuously. The iterative process of performing steps 420-460 is helpful to track the emergency service vehicle navigation over time as part of determining the intention of the vehicle.

Figure 5:
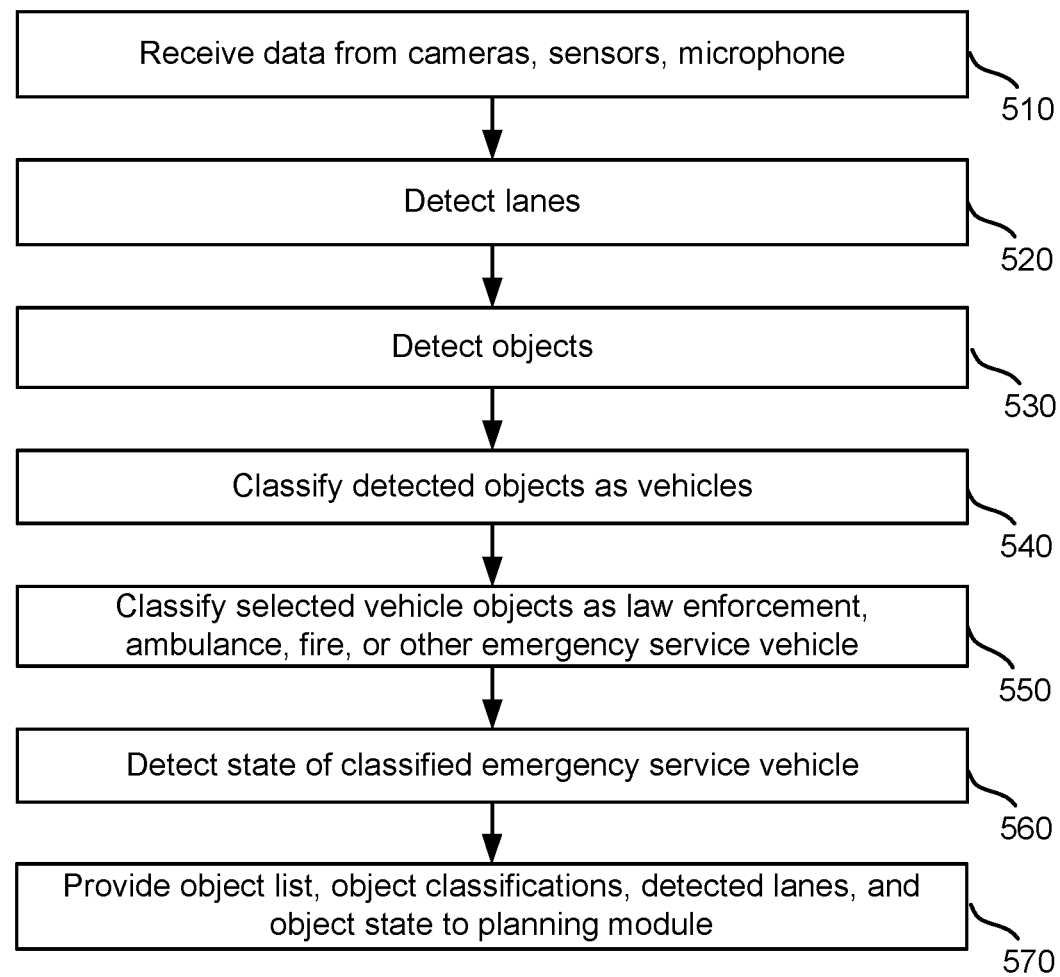
FIG. 5 is a method for receiving and processing perception data.

FIG. 5 is a method for receiving and processing perception data. The method of FIG. 5 provides more detail for step 420 of the method of FIG. 4. The method of FIG. 5 can be performed at least in part by perception module 320 that captures environment data during the operation of the AV. First, data is received from sensors such as cameras, radar, lidar, microphones, and optionally other sensors of the AV at step 510. The camera image data may include images and/or video of the environment through which the autonomous vehicle is traveling. Radar and lidar sensor data may indicate the features or signatures of objects as well as their position over time. Radar and lidar data may be processed to identify objects within the vicinity of the autonomous vehicle, such as between zero and several hundred feet of the autonomous vehicle. The processed radar and lidar data may indicate the speed, trajectory, velocity, and location of an object near the autonomous vehicle. Examples of objects detectable by radar and lidar include cars, trucks, people, and animals. One or more microphones may detect siren sounds emitted by an emergency service vehicle, as well as verbal instructions provided by an emergency service vehicle driver through a loudspeaker. Other sensors may include a V2X sensor that detects V2X signals transmitted by the emergency service vehicle. The V2X signal may be an instruction such as "pull over," "proceed with caution," "change lanes," and/or other instruction.

Road lanes are detected from the camera image data at step 520 and. Road lane detection may include identifying the boundaries of a particular road, path, or other throughway. The road boundaries and lane lines may be detected using pixel clustering algorithms or other image processing algorithms to recognize certain objects such as lane lines, one or more machine learning models trained to recognize road boundary and lane line objects within images, or by other object detection methods. The lane lines may be detected in enough detail to differentiate between a dotted lane line, double yellow lines, white lane boundary line, and other road lane types. Additionally, the boundaries of a road, for example, formed by a center divider, sidewalk, structure, or other element may be detected from the perception data retrieved at step 510.

Objects of interest may be identified from the camera image, video data, and/or other sensor data at step 530. Objects of interest may include a vehicle, a stop light, stop sign, other signs, and other objects of interest that can be recognized and processed by the data processing system. In some instances, image data may be processed using pixel clustering algorithms to recognize certain objects, machine learning, neural networks, and other suitable methods. In some instances, pixel data may be processed by one or more machine learning models are trained to recognize objects within images, such as vehicles, traffic light objects, stop sign objects, other sign objects, and other objects of interest.

One or more of the detected objects can be classified as vehicles at step 540. Data associated with a detected object may include images from a camera, data from a sensor, or a combination of data types. An object detected as a vehicle can be classified as an emergency service vehicle type at step 550. Emergency service vehicle type may include a law enforcement vehicle, ambulance, fire truck, or some other emergency service vehicle.

A vehicle and/or emergency service vehicle may be detected in any of several ways. For example, deep learning algorithms may be performed using different classifiers which classify a particular type of emergency service vehicle, such as a law enforcement vehicle, ambulance, or other type of emergency service vehicle. In some instances, computer vision may be used to classify a particular type of emergency service vehicle. When using computer vision, one or more algorithms may be used to extract features of the detected object, perform a feature correlation analysis, and calculate a correlation score to determine the likelihood that a particular detected object is a particular type of emergency service vehicle, such as a long force vehicle. A correlation score that satisfies a threshold or is the highest of the correlation scores, the detected object may be classified accordingly. Other methodologies may be used as well to classify an object as a vehicle and a vehicle as a particular type of emergency service vehicle.

A state of a vehicle classified as an emergency service vehicle may be detected at step 560. A state of an emergency service vehicle may indicate whether the vehicle can be treated as any other vehicle while in a "passive" or "off" mode or special planning and trajectories should be performed in response to detecting emergency service vehicle is operating in an "on" or "active" mode. In some instances, the state of an emergency service vehicle, such as a law enforcement vehicle, may be set to an "on" or "active" mode when any one or more of several conditions are detected, such as for example a vehicle siren is detected to be blaring, flashing lights (other than normal headlights, brake lights and turn signals) are detected to be flashing, officer instructions are output through a loudspeaker on the vehicle, or a V2X signal is transmitted that indicates an active state of the vehicle.

Detected lanes, an object list, object classifications, and object state(s) are provided to a planning module at step 570. For each object in the list, information may be included such as an identifier for the object, a classification of the object, location, trajectory, velocity, acceleration of the object, classification as vehicle and/or emergency service vehicle type, and in some instances other data.

Figure 6:
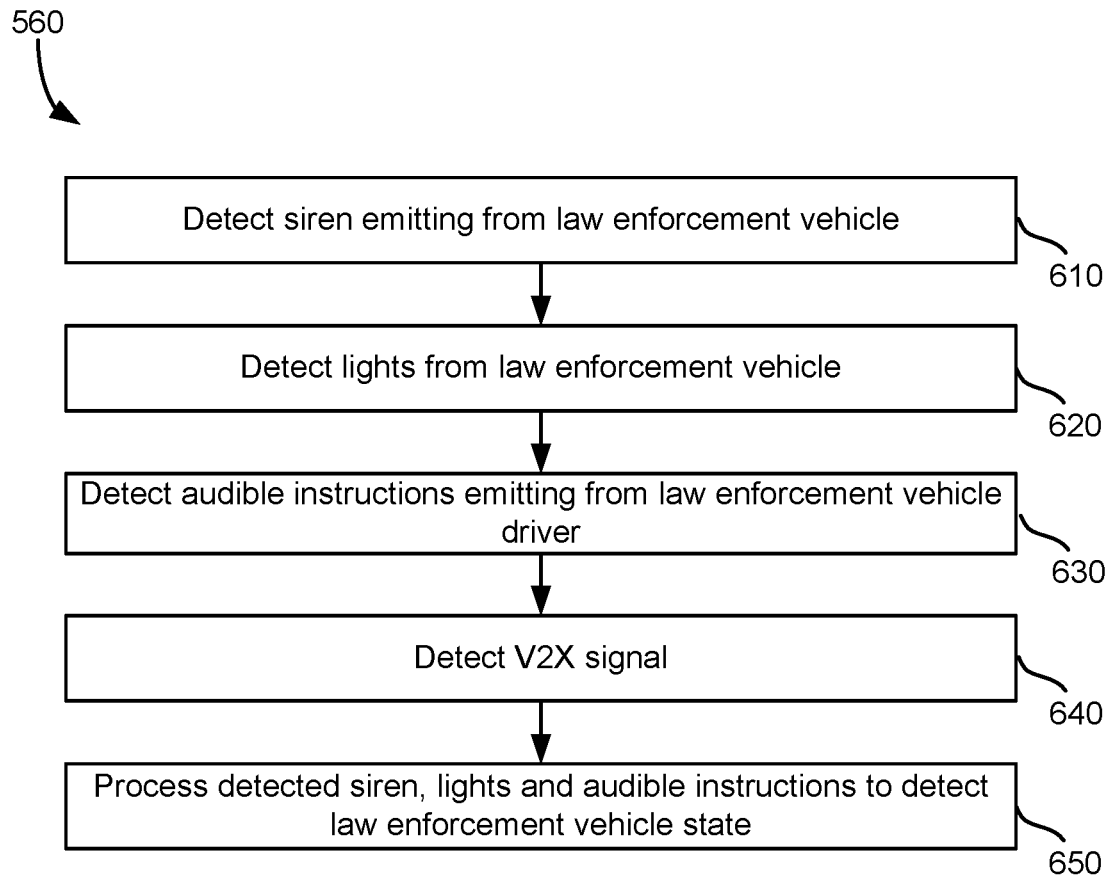
FIG. 6 is a method for detecting a state of a classified vehicle object.

FIG. 6 is a method for detecting a state of a classified vehicle object. The method of FIG. 6 provides more detail for step 560 of the method of FIG. 5. The method of FIG. 6 will be discussed with respect to a law enforcement vehicle, a state for other emergency service vehicle types can be determined in a similar manner. A siren emitting from a law enforcement vehicle is detected at step 610. One or more microphones may receive an audio signal emitted from the siren of the law enforcement vehicle and process the audio signal to recognize the siren. Lights emitting from a law enforcement vehicle may be detected at step 620. The lights may be flashing, spinning, or otherwise indicating the vehicle is in an active state and can be positioned on top of the law enforcement vehicle, in a rear window of the vehicle, or elsewhere on the vehicle. Law enforcement vehicle lights which flash or spin repeatedly, are different colors other than just white, for example, red and blue, may be detected using one or more cameras on an autonomous vehicle.

An audible instruction provided by a driver of a law enforcement vehicle may be detected at step 630. In some instances, instructions provided by an emergency service vehicle driver through a loudspeaker of the vehicle may be received and processed to determine the state of the vehicle. In some instances, instructions may be processed such that directional filters are used from the plurality of microphones to process only instructions received from the location of the law enforcement vehicle. In this instance, audio instructions may be received through one or more microphones of the AV, converted from speech to text via a speech-to-text module, the text can be parsed to identify grammar within the instructions, and then the parsed words with recognized grammar can be processed to determine the meaning of the instructions provided from the driver of the emergency service vehicle. The meaning of the instructions may be used to set a state for an emergency service vehicle. For example, for loud speaker broadcasted instructions of "pull over" while the vehicle is directly behind the AV, the emergency service vehicle can be detected to have an intention of "pulling over" the AV. In some instances, the data processing system of the AV may include a speech processing module that processes audio from an emergency service driver to determine the meaning of the audio, and processes the meaning to determine an intention for the emergency service vehicle.

A V2X signal may be detected at step 640. In some instance a law enforcement vehicle may transmit a V2X instruction that indicates an AV should pull over, stop, change lanes, or perform some other action.

A detection of one or more of an emergency service vehicle siren, lights, audible instructions, V2C, and other data are processed to detect a law enforcement vehicle state at step 650. In some instances, the law enforcement vehicle object state may be set to "normal" or "off," wherein the law enforcement vehicle siren is off, does not have any flashing lights, and is not transmitting any be to ask signals or audible instructions. An object associated with a law enforcement vehicle may have a state set to "emergency" or "active" if any of the sirens is on lights are flashing, the 2X signals indicating instructions to vehicles are being transmitted, or audible instructions signaling that the law enforcement vehicle is actively handling an emergency, condition of concern, or suspected law infraction.

Figure 7:
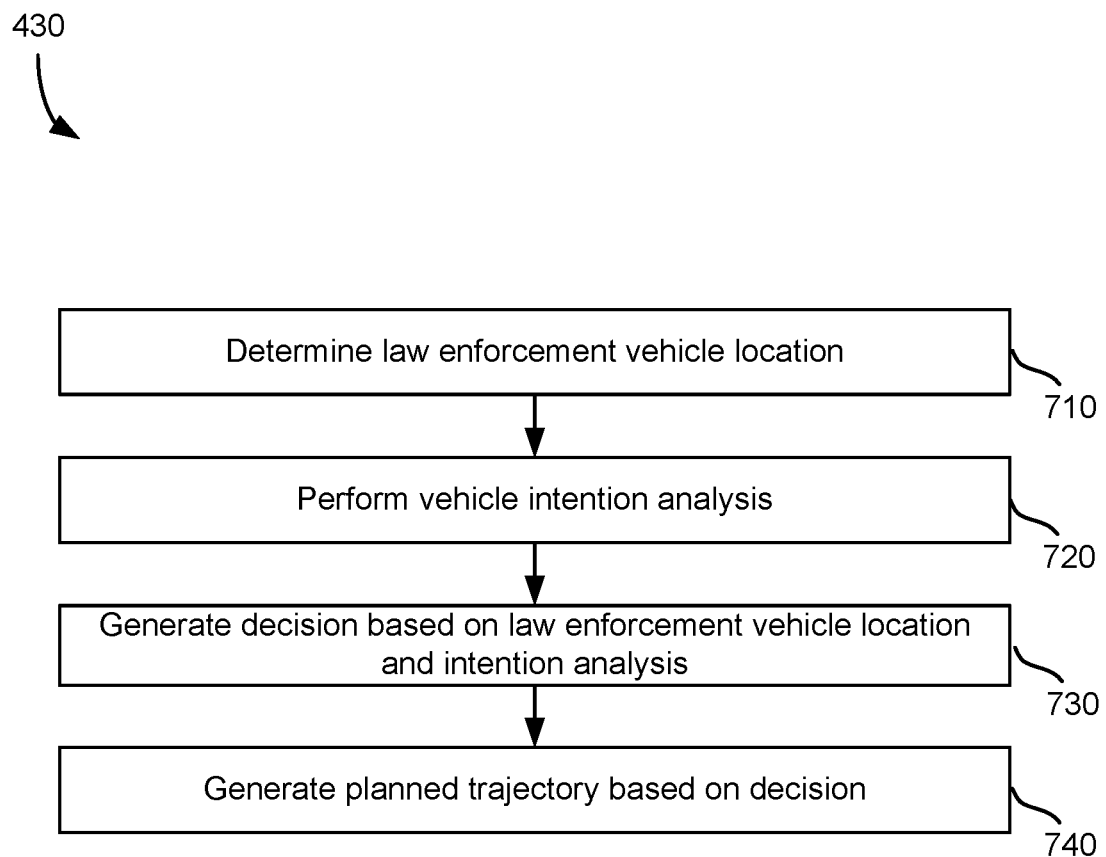
FIG. 7 is a method for planning a responsive action to detected object information.

FIG. 7 is a method for planning a responsive action to detected object information. The method of FIG. 7 provides more detail for step 430 of the method of FIG. 4. First, a law enforcement vehicle location is determined at step 710. The location is determined using perception data associated with a particular object, wherein the perception data can include camera data and sensor data, as well as detected lane lines. For instance, the position of a law enforcement vehicle may include determining the geographic location of the law enforcement vehicle as well as determining what driving lane the vehicle is in, including making a determination as to whether the law enforcement vehicle is in the same lane as the AV or a different lane. In some instances, a high definition map may also be used to determine the position and lane of the law enforcement vehicle.

A vehicle intention analysis is performed at step 720. The intention of a vehicle is determined based on the vehicle location, navigation history, and its current state. More details for performing a vehicle intention analysis are discussed with respect to the method of FIG. 8.

A decision as to a planned action based on a law enforcement vehicle location and intention analysis is generated at step 730. The decision may comply with traffic rules and regulations as well as on the intention and location of the law enforcement vehicle. For example, if a law enforcement vehicle is directly behind an AV, the AV may pull over to an adjacent lane or a shoulder to get out of the path of the law enforcement vehicle. If the law enforcement vehicle is detected to follow the AV into an adjacent lane, a decision may be made to navigate the AV to a shoulder of the road or other location away from the main lanes of the current road. If a law enforcement vehicle is detected to be ahead of and stopped in front of a lane, a decision can be made to proceed with caution and optionally change lanes in order to avoid an obstacle or other danger on the current road in which the law enforcement vehicle is parked.

Once a decision is made, a trajectory may be generated based on the decision at step 740. The trajectory may be generated to carry out the decision made by the AV in response to the law enforcement vehicle. To generate a trajectory, a sampling of trajectories from a current position, such as a center reference line of a current lane, to a destination point is generated. The sampling of trajectories may include a variety of trajectories from the current position to various points along destination position, such as a neighboring lane. Each generated trajectory is evaluated and ranked. Evaluating each trajectory within the plurality of sample trajectory lines includes determining objects in each trajectory, determining constraint considerations, and determining the cost of each trajectory, for example, terms of the jerk involved with navigating the trajectory. When evaluating a generated trajectory, each of several factors (objects in trajectory, constraint considerations, cost) in the ranking of a trajectory is considered, and the ranking is increased or decreased based on the outcome of a determination. For example, if a determination suggests that an object will exist in a particular trajectory, the ranking for that trajectory may be cut in half or reduced by a certain percentage. In some instances, some determinations may have a higher weighting than others, such as for example objects detected to be in the particular trajectory. The highest ranked trajectory is selected and provided by the planning module to the control module.

Constraints may be considered for each trajectory as part of the trajectory selection process. The constraints may include a lateral boundary, lateral offset, lateral speed, lateral acceleration, lateral jerk, and curvature of lane lines. Each constraint may increase or reduce the ranking of a particular trajectory based on the value of a constraint and thresholds associated with each particular constraint.

The cost of each sampled trajectory is determined and considered for the ranking of the trajectory. Examples of costs include a terminal offset cost, average offset costs, lane change time duration cost, lateral acceleration costs, and lateral jerk cost. When determining a cost, the ranking may be decreased if a particular cost-a threshold or out of a range, and the ranking may be increased if the cost is below a threshold, or within a desired range.

In addition to generating a planned trajectory, the data processing system may create a response that includes an acknowledgement signal and/or compliance to the emergency service vehicle. For example, when the emergency service vehicle (or vehicle driver) has a detected intention of pulling the AV over, the AV may generate a V2X signal, visual signal, or provide some other communication that it will pull over. Other examples of acknowledgement or compliance signals communicated to the emergency service vehicle can include flashing hazard lights or other flashing lights on the AV. The acknowledgement signal may change over time as the detected intention of the emergency service vehicle changes over time.

The AV vehicle may also generate a notification, such as an audible or visual message, notification, alarm, or other content, internal to the AV. The internal notification is received by one or more passengers of the AV to inform them of one or more of the emergency service vehicle intent, the planned response by the AV, or that one or more passengers should supervise or override the AV. The notification to the passengers can, for example, alert the passengers to supervise or override the navigation of the AV while the AV executes a decision based at least in part on the emergency service vehicle detected intention. The notification may include an audible or visual phrase, text or graphic that indicates one or more passengers should supervise or override the AV, illuminate a light on the AV that indicates a passenger should supervise or override the AV navigation, or some other notification.

Figure 8:
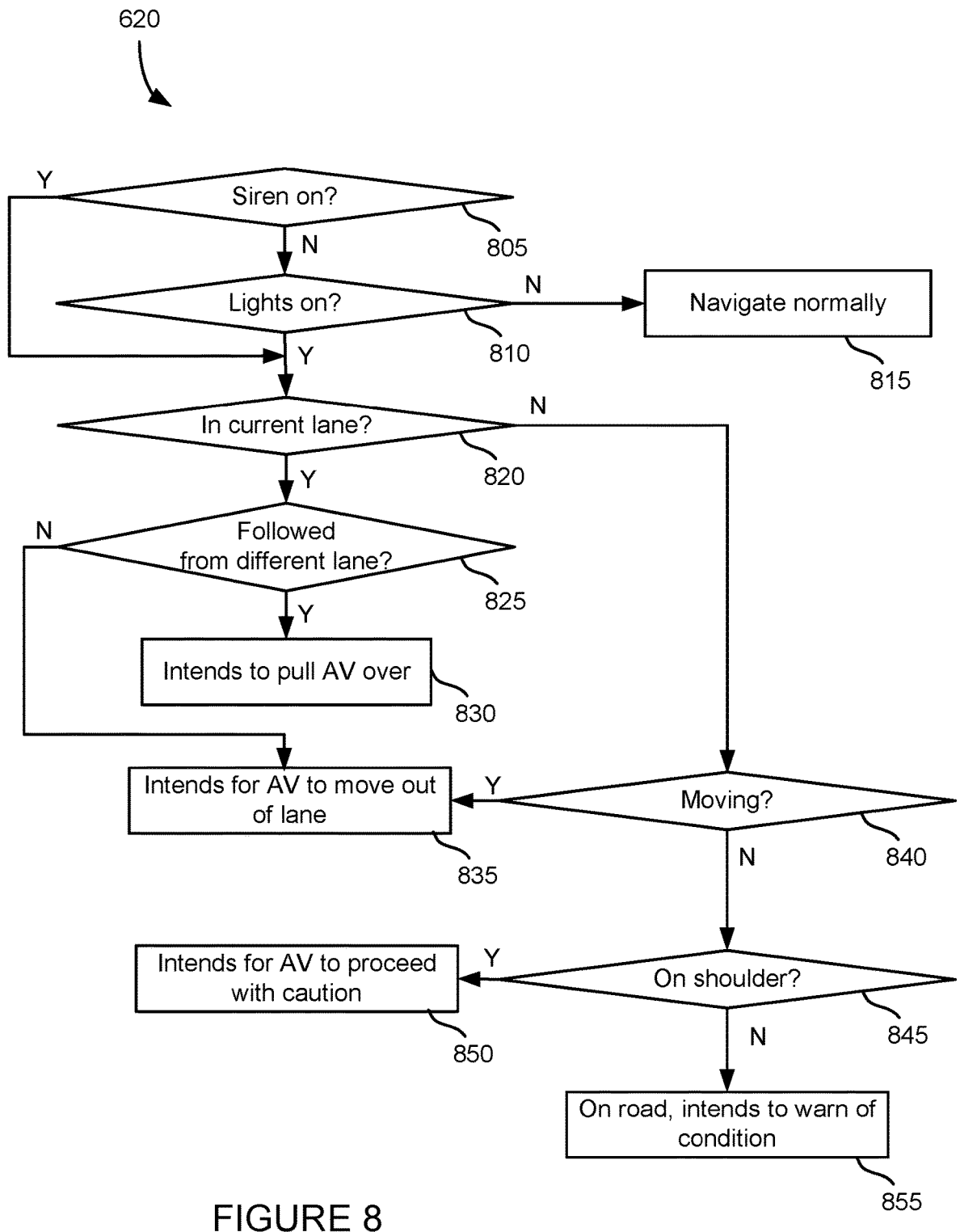
FIG. 8 is a method for detecting the intent of a vehicle object classified as a law enforcement vehicle.

FIG. 8 is a method for detecting the intent of a vehicle object classified as a law enforcement vehicle. The method of FIG. 8 provides more detail for step 620 of the method of FIG. 6. A determination is made as to whether a law enforcement vehicle siren is detected as being on at step 805. Microphones on the AV may detect the audio emitted from the siren to determine whether the siren is on or not. If the siren is determined to not be on, a determination is made as to whether any flashing lights are detected to be on the law enforcement vehicle at step 810. The flashing lights may be positioned on the roof of the vehicle, in the rear window of the vehicle, in the front or back of the vehicle, or some other position on the law enforcement vehicle. In some instances, flashing lights, such as a flashing red light, blue light or a combination of these, may be detected and differentiated between typical headlights, brake lights, and turn signals of a law enforcement vehicle. If flashing lights are detected to not be on for the law enforcement vehicle at step 810, it is determined that the driver of the law enforcement vehicle has no intent to control or direct the AV or other traffic, and the AV may navigate normally at step 815. If either the siren is determined to be on at step 805 or the flashing lights of the law enforcement vehicle are determined to be on at step 810, the law enforcement vehicle is actively engaging traffic and more information is needed, and the method of FIG. 8 continues to step 820.

A determination is made as to whether the law enforcement vehicle is in the current lane of the AV at step 820. If the law enforcement vehicle is in the same lane as the AV, a determination is made as to whether the law enforcement vehicle followed the AV from a different lane into the AV's current lane at step 825. If the law enforcement vehicle did not follow the AV to the current lane occupied by the AV, it is possible the law enforcement vehicle intends to navigate quickly through the current lane. As such, the intention of the law enforcement vehicle is interpreted to be that the AV should move out of the lane at step 835. Accordingly, a decision can be made by the AV data processing system to change lanes in response to the detected intention of the law enforcement vehicle.

If the law enforcement vehicle did follow the AV from a different lane to the current lane, the intention of the law enforcement vehicle is determined to be to pull over the AV at step 830. In response, a decision can be made by the AV data processing system to pull over to the shoulder of the road, or pull over to some other location that is a safe distance away from the lanes of the current road.

If a law enforcement vehicle has a siren on or lights on and is not in the current lane as the AV, a determination is made as to whether the law enforcement vehicle is moving at step 840. If the law enforcement vehicle is moving in a different lane, the intention is determined to be that the law enforcement vehicle wants the AV to stay out of the lane occupied by the law enforcement vehicle at step 835. Accordingly, a decision can be made by the AV data processing system to either change lanes away from the law enforcement vehicle, if safe, or to stay in the current lane.

If the law enforcement vehicle is in a lane but not moving at step 840, a determination is made as to whether the law enforcement vehicle is on the shoulder of the road at step 845. If the law enforcement vehicle is on the shoulder, the intention of the law enforcement vehicle is determined to be that it intends other vehicles should proceed with caution. Accordingly, a decision can be made by the AV data processing system to keep moving but proceed with caution with respect to the pulled over law enforcement vehicle.

If the law enforcement vehicle is not on the shoulder at step 845, the law enforcement vehicle is parked somewhere in a lane of the road and is not moving, and the intention is determined to be a warning of some condition in the road at step 855. Accordingly, a decision can be made by the AV data processing system to stay in the present lane and keep a minimum distance from the vehicle in front of the AV. In some instances, the AV may make a decision to not pass the law enforcement vehicle that has a siren and/or lights flashing and is stopped in the middle of the road.

Figure 9:
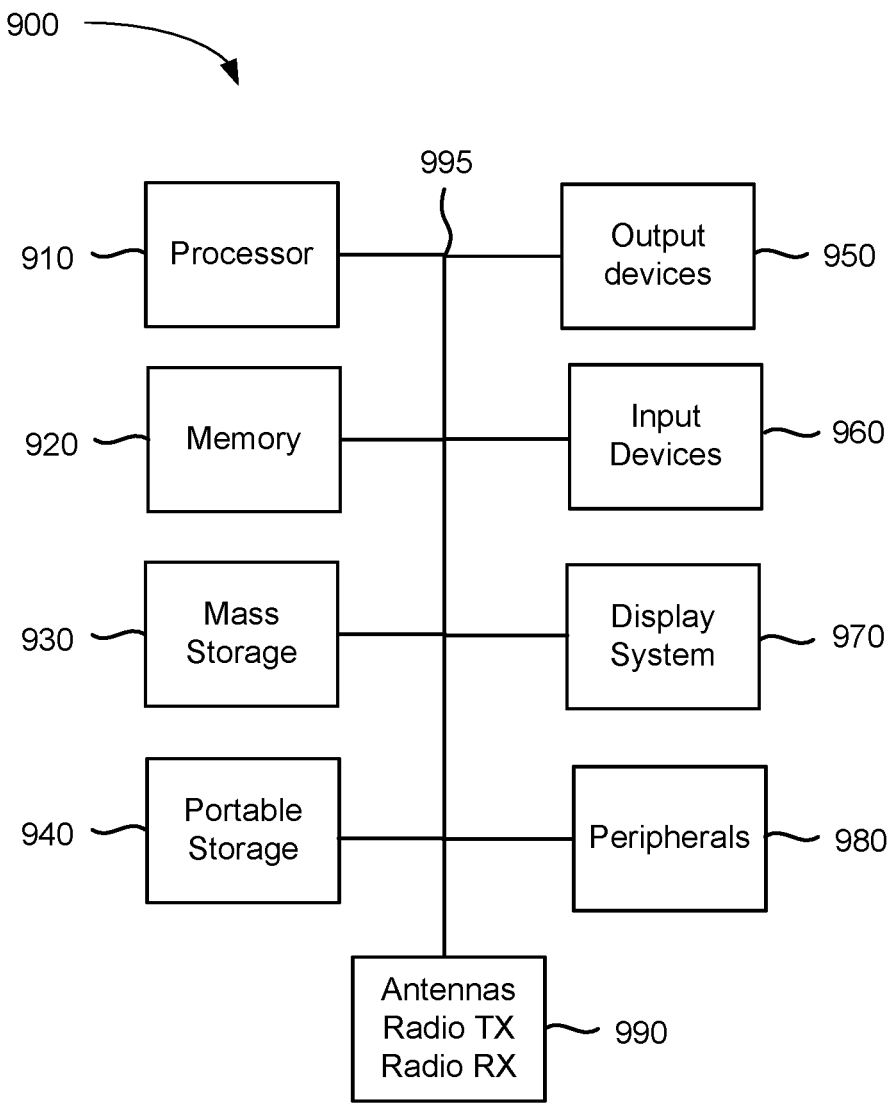
FIG. 9 is a block diagram of a computing environment for implementing a data processing system.

FIG. 9 is a block diagram of a computing environment for implementing a data processing system. System 1800 of FIG. 9 may be implemented in the contexts a machine that implements data processing system 125 on an autonomous vehicle. The computing system 900 of FIG. 9 includes one or more processors 910 and memory 920. Main memory 920 stores, in part, instructions, and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present technology for purposes of loading that software into main memory 920.

Portable storage device 940 operates in conjunction with a portable non-volatile storage medium, such as a flash drive, USB drive, memory card or stick, or other portable or removable memory, to input and output data and code to and from the computer system 900 of FIG. 9. The system software for implementing embodiments of the present technology may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, a wireless device connected via radio frequency, a motion sensing device, and other input devices. Additionally, the system 900 as shown in FIG. 9 includes output devices 950. Examples of suitable output devices include speakers, printers, network interfaces, speakers, and monitors.

Display system 970 may include a liquid crystal display (LCD) or other suitable display devices. Display system 970 receives textual and graphical information and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other devices.

The system of 900 may also include, in some implementations, antennas, radio transmitters and radio receivers 990. The antennas and radios may be implemented in devices such as smartphones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, handheld computing device, smartphone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A system for automatically responding to an emergency service vehicle, comprising:
 a data processing system comprising one or more processors, memory, a planning module, and a control module, the data processing system to:
 identify an object on a road based on received sensor data;
 classify the identified object as a type of emergency service vehicle based on the sensor data;
 determine the intention of the type of emergency service vehicle at least in part based on a location of the type of emergency service vehicle;
 generate a decision to respond to the emergency service vehicle based on the classification and the intention, wherein generating a decision includes:
 generating a plurality of trajectories for an autonomous vehicle based on the emergency service vehicle intention and location, detected lane lines, and detected boundaries of the road,
 generating a score for each of the plurality of trajectories, and
 selecting the trajectory with the highest score; and
 generate one or more commands to navigate along the selected trajectory.

2. The system of claim 1, wherein the type of emergency service vehicle is a law enforcement vehicle.

3. The system of claim 2, wherein determining the intention of the law enforcement vehicle includes:
 detecting a state of the law enforcement vehicle; and detecting the intention of the law enforcement vehicle based on the location of the law enforcement vehicle and the state of the law enforcement vehicle.

4. The system of claim 3, wherein the state of the law enforcement vehicle includes detecting a siren emitting from the law enforcement vehicle.

5. The system of claim 3, wherein the state of the law enforcement vehicle includes detecting flashing lights on law enforcement vehicle.

6. The system of claim 2, wherein determining the intention of the law enforcement vehicle includes detecting the location of the law enforcement vehicle with respect to detected lane lines on the road.

7. The system of claim 1, wherein the intention includes one of warning traffic, pulling over a car that is automatically responding to the emergency service vehicle, quickly navigating through traffic, and driving normally.

8. The system of claim 1, wherein classifying includes:
performing a first classification to classify the identified object as a vehicle; and
performing a second classification to classify the vehicle as a law enforcement vehicle.

9. The system of claim 1, wherein the type of emergency service vehicle is a fire truck or an ambulance, and the intention is stopping in a road, quickly navigating through traffic, and driving normally.

10. The system of claim 1, wherein the data processing system generates an acknowledgement to the emergency service vehicle.

11. The system of claim 1, wherein the data processing system generates a notification to one or more passengers inside the autonomous vehicle, the notification based on the decision to respond by the autonomous vehicle.

12. A non-transitory computer readable storage medium having embodied thereon a program, the program being executable by a processor to perform a method for automatically responding to an emergency service vehicle, the method comprising:
identifying an object on a road based on received sensor data;
classifying the identified object as a type of emergency service vehicle based on the sensor data;
determining the intention of the type of emergency service vehicle at least in part based on a location of the type of emergency service vehicle;
generating a decision to respond to the emergency service vehicle based on the classification and the intention, wherein generating a decision includes:
generating a plurality of trajectories for an autonomous vehicle based on the emergency service vehicle intention and location, detected lane lines, and detected boundaries of the road,
generating a score for each of the plurality of trajectories, and
selecting the trajectory with the highest score; and
generating one or more commands to navigate along the selected trajectory.

13. The non-transitory computer readable storage medium of claim 12, wherein the type of emergency service vehicle is a law enforcement vehicle.

14. The non-transitory computer readable storage medium of claim 13, wherein determining the intention of the law enforcement vehicle includes:

detecting a state of the law enforcement vehicle; and
detecting the intention of the law enforcement vehicle based on a location of the law enforcement vehicle and the state of the law enforcement vehicle.

15. The non-transitory computer readable storage medium of claim 14, wherein the state of the law enforcement vehicle includes detecting a siren emitting from the law enforcement vehicle.

16. The non-transitory computer readable storage medium of claim 14, wherein the state of the law enforcement vehicle includes detecting flashing lights on law enforcement vehicle.

17. The non-transitory computer readable storage medium of claim 13, wherein determining the intention of the law enforcement vehicle includes detecting the location of the law enforcement vehicle with respect to detected lane lines on the road.

18. The non-transitory computer readable storage medium of claim 12, wherein the intention includes one of warning traffic, pulling over a car that is automatically responding to the emergency service vehicle, quickly navigating through traffic, and driving normally.

19. The non-transitory computer readable storage medium of claim 12, wherein the data processing system generates an acknowledgement to the emergency service vehicle.

20. The non-transitory computer readable storage medium of claim 12, wherein the data processing system generates a notification to one or more passengers inside the autonomous vehicle, the notification based on the decision to respond by the autonomous vehicle.

21. A method for automatically responding to an emergency service vehicle, comprising:
identifying, by a data processing system stored in memory and executed by one or more processors, an object on a road based on received sensor data;
classifying, by a data processing system, the identified object as a type of emergency service vehicle based on the sensor data;
determining, by a data processing system, the intention of the type of emergency service vehicle at least in part based on a location of the type of emergency service vehicle;
generating a decision to respond to the emergency service vehicle based on the classification and the intention, wherein generating a decision includes:
generating a plurality of trajectories for an autonomous vehicle based on the emergency service vehicle intention and location, detected lane lines, and detected boundaries of the road,
generating a score for each of the plurality of trajectories, and
selecting the trajectory with the highest score; and
generating one or more commands to navigate along the selected trajectory.

22. The method of claim 21, wherein the type of emergency service vehicle is a law enforcement vehicle.

23. The method of claim 22, wherein determining the intention of the law enforcement vehicle includes:
detecting a state of the law enforcement vehicle; and
detecting the intention of the law enforcement vehicle based on a location of the law enforcement vehicle and the state of the law enforcement vehicle.

* * * * *